(No Model.)
E. ADAM & M. O. REHFUSS.
STERILIZING APPARATUS.
No. 510,757. Patented Dec. 12, 1893.
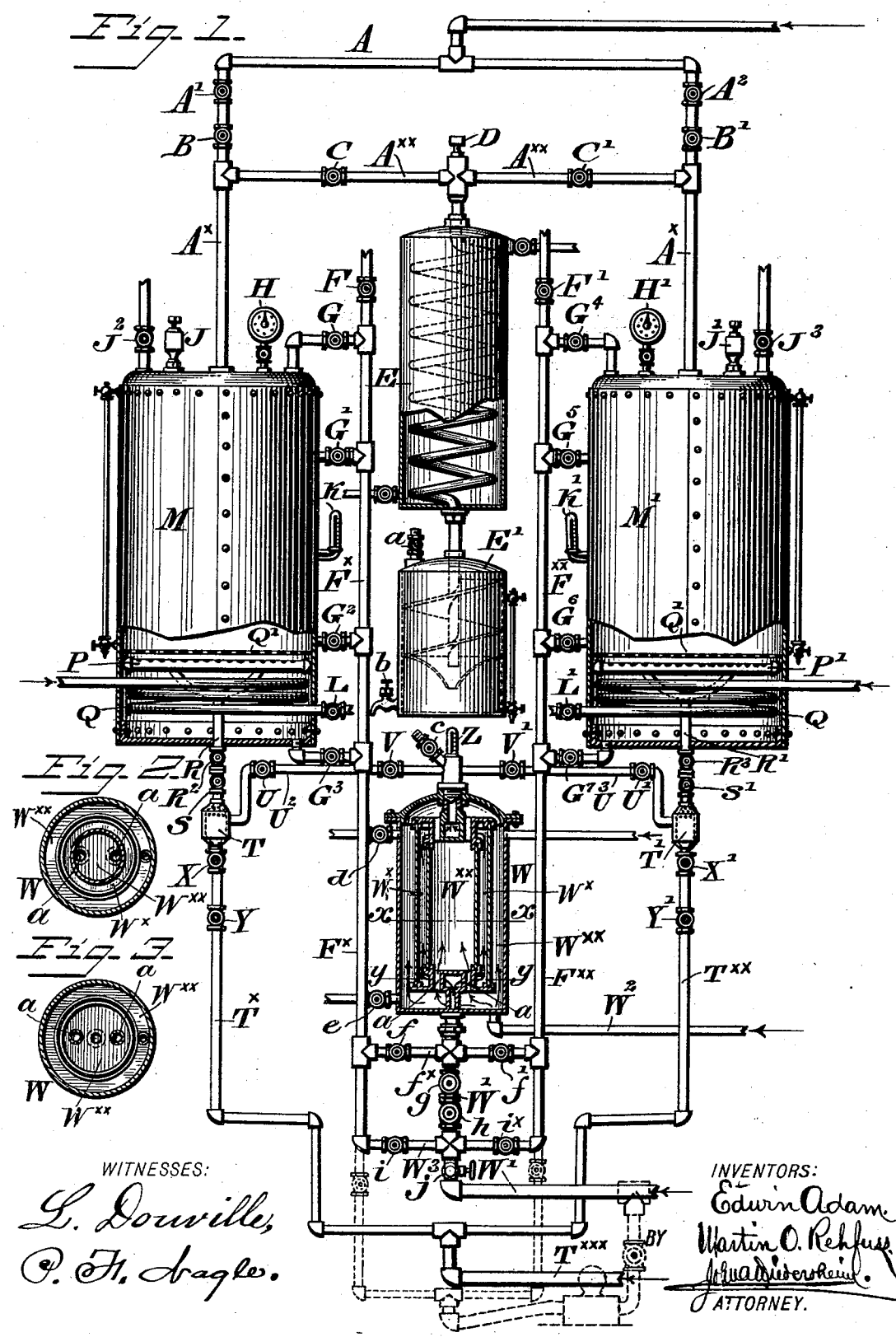
WITNESSES:
L. Douville,
C. H. Aragle.
INVENTORS:
Edwin Adam.
Martin O. Rehfuss
BY
ATTORNEY.
THE NATIONAL LITHOGRAPHING COMPANY,
WASHINGTON, D. C.

UNITED STATES PATENT OFFICE.

EDWIN ADAM AND MARTIN O. REHFUSS, OF PHILADELPHIA, PENNSYLVANIA; SAID REHFUSS ASSIGNOR TO SAID ADAM.

STERILIZING APPARATUS.

SPECIFICATION forming part of Letters Patent No. 510,757, dated December 12, 1893.

Application filed August 3, 1893. Serial No. 482,225. (No model.)

*To all whom it may concern:*

Be it known that we, EDWIN ADAM and MARTIN O. REHFUSS, citizens of the United States, both residing in the city and county of Philadelphia, State of Pennsylvania, have invented a new and useful Improvement in Apparatus for Sterilizing Fermented and Blended Fermented and Unfermented Malt Liquids, which improvement is fully set forth in the following specification and accompanying drawings.

Our invention consists of an apparatus for sterilizing fermented and blended fermented and unfermented malt liquids, embodying two or more sterilizing vessels with means for forcing a liquid from one vessel to another in reversed directions.

It also consists of means for raising and lowering the temperature of the liquid after the sterilizing process is completed. In addition to the above we employ means for purifying the liquid, for condensing the alcoholic fumes which are carried out with the air while sterilizing, and other features as are included in an application for Letters Patent filed by us on the 23d day of May, 1892, Serial No. 475,194.

Figure 1 represents a partial side elevation and partial vertical section of an apparatus embodying our invention. Fig. 2 represents a horizontal section on line $x, x$, Fig. 1. Fig. 3 represents a horizontal section on line $y, y$, Fig. 1.

Similar letters of reference indicate corresponding parts in the several figures.

Referring to the drawings: A designates an air supply pipe, whose branches $A^\times$ are provided with check valves $A'$, $A^2$, and air inlet valves B, and $B'$, which latter are opened and closed alternately for admitting air into either of the sterilizing and compressing vessels M, and $M'$, with which the ends of said branches $A^\times$ are connected.

$A^{\times\times}$ designates a pipe which is connected with the branches $A^\times$, and provided with valves C, $C'$, to be hereinafter again referred to, and with the valve D for regulating the pressure in the sterilizing vessels M, $M'$.

E designates a condenser for the alcoholic fumes, the same being connected with the pipe $A^{\times\times}$ and with the vessel $E'$ which catches the alcohol.

F and $F'$ designate outlet valves, respectively, on the pipes $F^\times$, $F^{\times\times}$, the pipe $F^\times$ having inlet and outlet valves G, $G'$, $G^2$ and $G^3$ for the liquid passing to and from the vessel M, and the pipe $F^{\times\times}$ having inlet and outlet valves $G^4$, $G^5$, $G^6$, $G^7$ for the liquid passing to and from the vessel $M'$. The vessels M, $M'$, are provided with gages H, $H'$, for indicating the pressure therein, and with safety valves J, $J'$, outlet valves $J^2$, $J^3$ and thermometers K, $K'$, for evident purposes.

Within the vessels M, $M'$, at or near the bottom thereof, are coils Q, Q for steam or cold water, the same having outlet valves L, $L'$. Connected with said coils are perforated pipes P, $P'$, and above the latter are perforated plates or diaphragms $Q'$, $Q'$, the latter serving to distribute hot or heated air throughout the body of liquid in the vessels M, $M'$, as will be hereinafter more fully explained.

Connected with the pipes P, $P'$, and passing through the bottom of the vessels M, $M'$ are pipes R, $R'$, which are provided with check valves $R^2$, $R^3$, and inlet valves S, $S'$, the latter being adapted for directing streams of liquid charged with hot air into the vessels M, $M'$, said pipes R, $R'$, having connected with them the chargers T, $T'$, for heating the streams of liquid passing into the vessels M, $M'$. The chargers are provided with check valves U and $U'$, on the pipes $U^2$, $U^3$, the latter also having the inlet valves V, $V'$, and being connected with the apparatus W adapted for heating the liquid previous to entering the chargers T, $T'$, and vessels M, $M'$.

Connected with the chargers T, $T'$, are pipes $T^\times$, $T^{\times\times}$ which are provided respectively with check valves X, $X'$, and inlet valves Y, $Y'$, both for hot or cold air, said pipes $T^\times$, $T^{\times\times}$ having connected with them the hot or cold air supply pipe $T^{\times\times\times}$.

The heating apparatus W consists of the liquid-receiving chamber $W^\times$ which is connected with the supply pipe $W'$ and inclosing exterior and interior steam chambers $W^{\times\times}$, $W^{\times\times}$, which are connected with the supply pipe $W^2$ by means of the pipes $a$. The apparatus W is provided with a thermometer Z, the air supply connection and valve $c$, and the hot or cold water outlets $d$ and $e$. The pipe $f^\times$, which is below the apparatus W, joins the pipes $F^\times$, $F^{\times\times}$, and is provided with the valves $f, f'$. The pipe W' is provided with the check valve $g$ and the valve $h$ for the liquid entering the apparatus W.

In the pipe $W^3$, which joins the lower ends of the pipes $F^\times$ and $F^{\times\times}$ are the liquid inlet valves $i, i^\times$. The portion of the pipe W', below said pipe $W^3$ is provided with the liquid supply valve $j$.

The alcohol vessel E' is provided with a vent $a$ for the escape of the air which passes through the valve D with the alcohol fumes from the vessels M and M', said vessel E' being also provided with a cock $b$, or other means of removing the alcohol therefrom.

The operation is as follows: Liquid is directed by the pipe W' through the valves $j$, $h$ and $g$ into the inner chamber $W^\times$ of the heating apparatus W. Steam or hot water, (or both) is directed into the two chambers $W^{\times\times}$, $W^{\times\times}$, of said apparatus, so as to heat the liquid in said chamber $W^\times$. The liquid then passes the thermometer Z, and through valve V and check valve U into and through the hot or cold air charger T, (which latter is not yet in operation) and next through the valve S and check valve R into the vessel M, it being distributed in said vessel owing to the perforated pipe P and diaphragm Q', said vessel having a desired pressure, which is regulated and retained by the valve D. The liquid now forces the air in the vessel from the same into and through the valve C and valve D, and into the coil of the condenser E, and from thence into the receiver E'. The air now escapes from the latter through the vent $a$, as rapidly as the liquid is forced into the vessel M, thereby forcing out the air under pressure. When the vessel is sufficiently filled with liquid, the valves $j$, V, S, and C are closed, and the valves C', V', S' and $i$ are opened. The air supply valve B and liquid valve $G^3$ are also opened. The air coming through valve B from the air supply pipe A, then forces the liquid from the vessel M through the valves $G^3$, $i$, $h$ and $g$ into and through the heating apparatus W, it then passing the thermometer Z, and out through the valve V' and check valves U' into and through the hot or cold air charger T', the valves S', and the check valve $R^3$, into the sterilizing and compressing vessel M', it passing through the pipe P' and diaphragm Q' which distributes the liquid in said vessel, the latter being under pressure regulated and controlled by the valve D. The liquid now forces the air from the vessel M' under pressure through the valve C and the valve D into and through the coil in the condenser E, where it is condensed, and from whence it is directed into the receiver E'. The air then escapes through the vent $a$ as rapidly as the liquid is forced into the vessel M' under its air pressure. When all of the liquid contained in the vessel M is forced into the vessel M', then the process is reversed by closing the air valve B and opening the air valve B' for the purpose of forcing the contents of vessel M' again into the vessel M, the corresponding liquid valves being also respectively closed and opened. The above described process of forcing the liquid from the vessel M to the vessel M', and vice-versa under pressure at the same time passing the liquid into and through the heating apparatus W as described, is continued until the liquid in either vessel M or M' indicates a temperature of 40° Reaumur, on either thermometer K or K'. The circulating steam or hot water is then shut off in the heating apparatus W and the liquid is subjected to the hot air aerating process. When the liquid is in the vessel M, the valves $B^2$, G, $G^3$, $i$ and C are closed, and the valves $i'$, Y', S', $c'$, the air supply valve B and liquid valve $G^3$ are opened. The air then forces the liquid out of the vessel M through the valves $G^3$, $i$, $h$, and check valve $g$ into and through the apparatus W (this latter being now out of operation) and out through valve V' and check valve U', passing thermometer Z, and then into and through the hot or cold air charger T', where hot air is directed into the liquid by opening valve Y'. The liquid thus charged with hot air passes through the valve S' and check valve $K^3$ and is then distributed under pressure through the perforated cross pipe P' and plate Q' into the vessel M'. Under said pressure, the introduced hot air passes through the liquid and out of said vessel through valve C', and pressure regulating valve D, and into and through the coil in condenser E, where the alcohol fumes carried off with the air are condensed, and pass with the air into the receiver E'. The air then escapes and passes through and out of vent $a$, and the alcohol is retained in the said receiver. The alcohol may then be returned to the liquid, after the same is cooled, if so desired. When all of the liquid is forced from one vessel to the other, it is then forced back again to the former vessel, undergoing the same latter process. This is also accomplished by opening and closing the different valves as in the former treatment. This latter process is continued until the liquid in either vessel M, or M' attains a temperature of 52°, indicated by the thermometer K or K'. The valves are then all closed, and the liquid in the heating apparatus W is forced, (if the vessel M contains the latterly treated liquid) into the liquid in vessel M by opening the valves $f$ and G, and connecting the air supply hose to connection $c$, when all the liquid from the heating apparatus is then forced into vessel M the valves $f$ and G being then also closed. The temperature of (52° Reaumur) the liquid is then retained in said vessel M by either circulating steam or hot water through the coil Q in said vessel, and the hot air is also forced and sprayed into the liquid through the pipe P by opening valves Y and S for the purpose of retaining the pressure and temperature of the liquid if so desired. This temperature of 52°, and the required pressure on the liquid are retained a sufficient length of time necessary to destroy the yeast cells and other fungus growths contained therein. The steam or hot water is then shut off in the coil Q and cold water is then circulated through coils Q, Q, and apparatus W. The valves $i$, $h$, V, S' and C are then opened, the air supply valve B and liquid valve $G^3$ being also opened, and the liquid is thus cooled by forcing the same from the vessel M to the vessel M', and so on from one vessel to the other by opening and closing the corresponding valves. Cold air may also be directed into the liquid through or by the air charger T and $T^\times$, while liquid is being forced from one vessel to the other for the purpose of cooling the same. After the liquid is cooled down to a desired temperature, the same can then be charged artificially with carbonic acid gas, or the same may be kept in air tight vessels until wanted.

Having thus described our invention, what we claim as new, and desire to secure by Letters Patent, is—

1. Two or more sterilizing vessels, liquid supply pipes connected with the same, and valves on said pipes, in combination with a heating apparatus, pipes connecting the latter with said vessels forming communications for said vessels and apparatus in reverse direction, and liquid and heat-supplying pipes connected with different chambers of said apparatus, substantially as described.

2. Two or more sterilizing vessels, and a heating apparatus for the same, in combination with the pipes $F^\times$, $F^{\times\times}$ which are connected with said vessels, the pipes $U^2$, $U^3$ with valves U connected with said vessel and apparatus, the pipes $f^\times$, $W^3$ connected with said pipes $F^\times$, $F^{\times\times}$, and the liquid supply pipe W' of said apparatus, the valves $f, f'$ on said pipe $f^\times$ and the valves $i, i^\times$, on said pipe $W^3$, substantially as described.

3. Two or more sterilizing vessels, a heating apparatus, liquid and heat-supplying pipes connected with said apparatus, and pipes connecting said apparatus with said vessels forming communications in reversed directions for said apparatus and vessels, in combination with the air supply pipe A, which is connected with said vessels, and provided with the check and inlet valves A', $A^2$, B, B', and the pressure regulating valve D, substantially as described.

4. Two or more sterilizing vessels, a heating apparatus, liquid and heat-supplying pipes connected with said apparatus, and pipes connecting said apparatus with said vessels, forming communications in reversed directions for said apparatus and vessels, in combination with the air supply pipe A, which is connected with said vessels, and provided with check, inlet and pressure regulating valves, the condenser E connected with said pipe A, and the alcohol receiver E' connected with said condenser, substantially as described.

EDWIN ADAM.
MARTIN O. REHFUSS.

Witnesses:
JOHN A. WIEDERSHEIM,
A. P. JENNINGS.